(12) United States Patent
Adorno et al.

(10) Patent No.: US 11,858,610 B1
(45) Date of Patent: Jan. 2, 2024

(54) VACUUM LIFT APPARATUS

(71) Applicant: Government of the United States, as represented by the Secretary of the Air Force, Wright-Patterson AFB, OH (US)

(72) Inventors: Ruben Adorno, Dayton, OH (US); Anthony Palazotto, Dayton, OH (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 560 days.

(21) Appl. No.: 16/925,376

(22) Filed: Jul. 10, 2020

Related U.S. Application Data

(60) Provisional application No. 62/883,595, filed on Aug. 6, 2019.

(51) Int. Cl.
*B64B 1/58* (2006.01)
*B66F 19/00* (2006.01)

(52) U.S. Cl.
CPC ............... *B64B 1/58* (2013.01); *B66F 19/00* (2013.01); *B66F 2700/09* (2013.01)

(58) Field of Classification Search
CPC .... B64B 1/02; B64B 1/06; B64B 1/40; B64B 1/58; B66F 19/00; B66F 2700/09
See application file for complete search history.

(56) References Cited

U.S. PATENT DOCUMENTS

| | | | | |
|---|---|---|---|---|
| 1,019,368 | A * | 3/1912 | Sayer | B64B 1/40 244/31 |
| 3,288,398 | A * | 11/1966 | Axelsson | B64B 1/58 244/31 |
| 4,113,206 | A * | 9/1978 | Wheeler | B64B 1/08 52/63 |
| 4,183,378 | A * | 1/1980 | Decker | B64B 1/06 52/173.3 |
| 6,287,277 | B1 | 9/2001 | Yan | |
| 9,475,567 | B1 * | 10/2016 | Roach | B64B 1/58 |
| 9,828,081 | B1 * | 11/2017 | DeVaul | B64B 1/44 |
| 10,843,783 | B1 * | 11/2020 | Cranston | B64B 1/62 |
| 2004/0172888 | A1 * | 9/2004 | Shearing | B64B 1/40 52/81.1 |
| 2006/0038062 | A1 | 2/2006 | Akhmeteli et al. | |
| 2006/0038073 | A1 * | 2/2006 | Shearing | B64B 1/58 244/125 |

* cited by examiner

*Primary Examiner* — Michael H Wang
*Assistant Examiner* — Colin Zohoori
(74) *Attorney, Agent, or Firm* — AFMCLO/JAZ; Matthew D. Fair

(57) ABSTRACT

An apparatus for lifting a load to a desired altitude using an evacuated hollow lift body is disclosed. Once evacuated, the apparatus is lighter than the surrounding atmosphere. The lift body can be formed as a hollow fluid tight structure with a tube wound and sealed in a helical pattern or a dual membrane structure with a pressurized intermediate volume sandwiched between inner and outer membranes. A load can be attached to the apparatus and lifted to an altitude where the effective density of the apparatus and load is equivalent to the density of the surrounding atmosphere.

7 Claims, 4 Drawing Sheets

VACUUM LIFT APPARATUS

RIGHTS OF THE GOVERNMENT

The invention described herein may be manufactured and used by or for the Government of the United States for all governmental purposes without the payment of any royalty.

TECHNICAL FIELD

The present disclosure generally relates to a vacuum lift apparatus and more particularly, but not exclusively to an apparatus that achieves positive buoyancy in an atmosphere of any planet.

BACKGROUND

Lighter than air systems (LTAS) have been used for many applications including airships, aerostats, blimps, and balloons. More recently LTAS have been used for high-altitude, long-endurance sensorial applications, such as communication relays between satellite, aircraft and ground communications, weather forecasting, and intelligence, surveillance and reconnaissance.

Prior art lighter than air systems (LTAS) are possible through the use of lighter than air gases, commonly known as "lifting gases", such as Helium and Hydrogen. Lifting gases stiffen the otherwise compliant lightweight wall structures, allowing these systems to sustain the pressure difference brought by the displaced air in order to achieve positive buoyancy.

Helium is a nonrenewable source commonly-used lifting gas in LTAS, listed in the List of Critical Minerals 2018 along with 34 other minerals that the United States considers critical. A vacuum lighter than air system (VLTAS) using a vacuum lift apparatus has the potential of yielding innovative advances in LTAS utilization as well as minimizing the use of Helium.

Many problems must be overcome to make an operating vacuum lift apparatus. One such problem is that without a lifting gas to counteract the inward pressure exerted by the external air pressure, a VLTAS relies solely on the structural configuration and material stiffness to counteract external pressure forces. This results in a design space that challenges the capability of typical materials and geometries to overcome the compliance counteracted by the lifting gas. Because existing systems have various shortcomings, drawbacks, and disadvantages relative to certain applications, there remains a need for further contributions in this area of technology.

SUMMARY

One embodiment of the present disclosure includes a unique vacuum lift apparatus configured to provide lift in an atmosphere surrounding earth or other planets. Other embodiments include apparatuses, systems, devices, hardware, methods, and combinations wherein the vacuum lift apparatus includes a tube that is filled with a gas and forms a hollow structure that can be evacuated. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
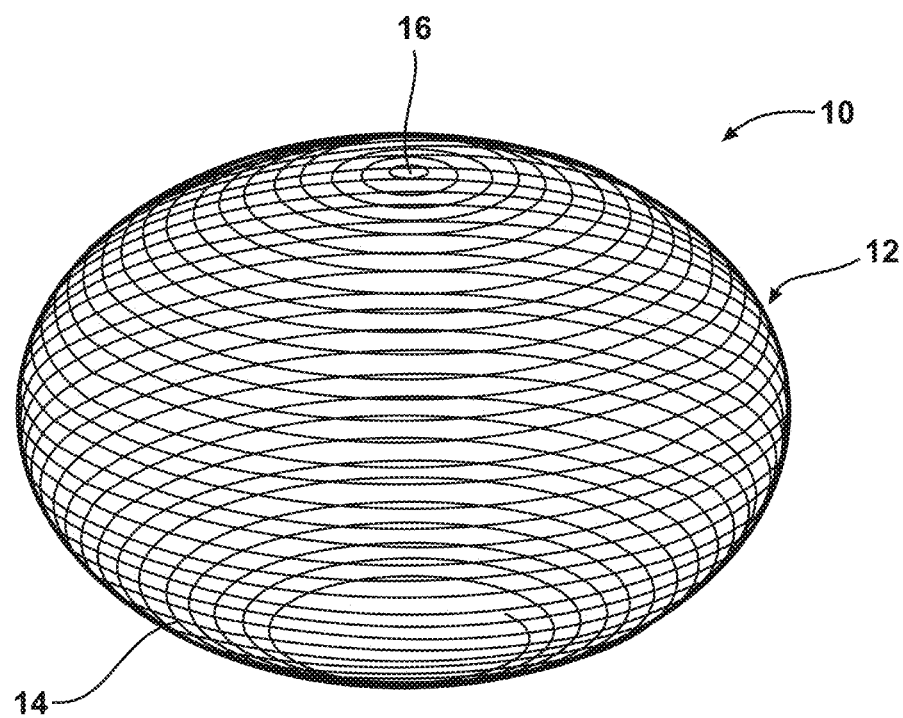
FIG. 1 is a schematic perspective view of a vacuum lift apparatus according one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

A vacuum lift apparatus must have a weight to buoyancy ratio (W/B) that is less than 1 in order to provide lift. The weight to buoyancy (W/B) ratio is a function of the air weight/density, air pressure loading and system weight.

Equation (1) provides a generalized representation for W/B ratio.

$$\frac{W}{B} = \frac{\sum V_c \rho_c}{V_a \rho_a} = \quad (1)$$

$$f(\text{air weight, loading, structural weight, manufacturability}) \leq 1$$

where:
$V_c$=system component volume
$V_a$=displaced air volume
$\rho_c$=system component density
$\rho_a$=displaced air density The vacuum lift apparatus is defined by a hollow structure that is evacuated to provide a lower density apparatus relative to the surrounding atmosphere. In one form, the vacuum lift apparatus can be defined by a helical sphere made from a tube formed in an Archimedean spiral. The three-dimensional (3D) projection onto a sphere becomes a spherical helix. The helical sphere can be formed from a single hollow tube or a plurality of hollow tubes connected together to form a spherical helix path. The hollow tube can be made of a thin membrane material filled with air or other gases such as nitrogen, helium or other lighter than air gases. The weight of such geometry is driven by the internal spherical radius, and the tube's radius and wall thickness, and density of the materials. The tube is subjected to the vacuum pressure, external air pressure, and tube internal pressure, where $P_{vac} \ll P_{ext}$ such that enough air weight is removed to permit buoyancy, and $P_{int} \geq P_{ext}$ in order for the tube's membrane to remain in tension.

From a stress perspective, the local hoop stress follows equation (2), which reduces the stress level significantly compared to a perfect sphere design, where the stress is proportional to R, i.e. $\sigma \propto \Delta P \left( \dfrac{R}{2t} \right)$.

Pressure differentials, $\Delta P$, are formed by the difference between the tube internal and vacuum pressures, $\Delta P_{ci} = P_{int} - P_{vac}$, and the difference between the tube internal and external air pressures, $\Delta P_{co} = P_{int} - P_{ext}$. Furthermore, increasing the number of revolutions reduces the local stress further by consequentially reducing $r_i$.

$$\sigma \propto \Delta P \dfrac{ri}{t} \quad (2)$$

where:
$\Delta P$=pressure differential
t=tube membrane thickness
r=tube radius

The tube can be made from any lightweight fluid impervious material, including but not limited to polymer films, such as Polyethylene Terephthalate (PET) and Polyethylene Naphthalate (PEN) films.

Another method for forming a lifting body can include two concentric spherical membranes that may be fused in a spherical helix path. The unfused, or unconnected, regions between the two membranes is filled with air to provide structural rigidity to the wall made of the membranes.

Referring now to FIG. 1, a schematic perspective view of a vacuum lift apparatus 10 according one embodiment of the present disclosure is depicted. In the disclosed embodiment, the vacuum lift apparatus 10 includes a hollow portion such as a helical sphere 12 defined by a tube 14 that is wound in a helical pattern. It should be understood that the present invention is not limited to the disclosed embodiment and thus other shapes (i.e. shapes other than a helical sphere) are contemplated herein. A vacuum port 16 can be formed proximate the top of the vacuum lift apparatus 10 at one of the tube ends. While the vacuum port 16 is shown at the top, it should be understood that the vacuum port 16 may be positioned anywhere on the vacuum lift apparatus 10. In the disclosed embodiment, the tube 14 is illustrated with space between adjacent winding layers for clarity, however in practice the tube 14 contact and seal to adjacent tube winding layers at either side thereof so that the internal vacuum of the lift apparatus 10 can be maintained.

The vacuum port 16 may include a valve (not shown) so as to permit gas (e.g. air or other atmosphere) to be pumped therethrough as would be known to those skilled in the art. Pumping the atmosphere out of the hollow region will create an internal vacuum and cause the apparatus to rise in altitude if no external restraints are engaged therewith. Conversely, pumping atmospheric gas into the hollow region will reduce or eliminate the vacuum and thus cause the apparatus 10 to move to a lower altitude until a buoyancy equilibrium is reached or the apparatus 10 lands on the surface of the planet. In this manner, the altitude of the lift apparatus 10 may be actively controlled with an electric valve.

Figure 2:
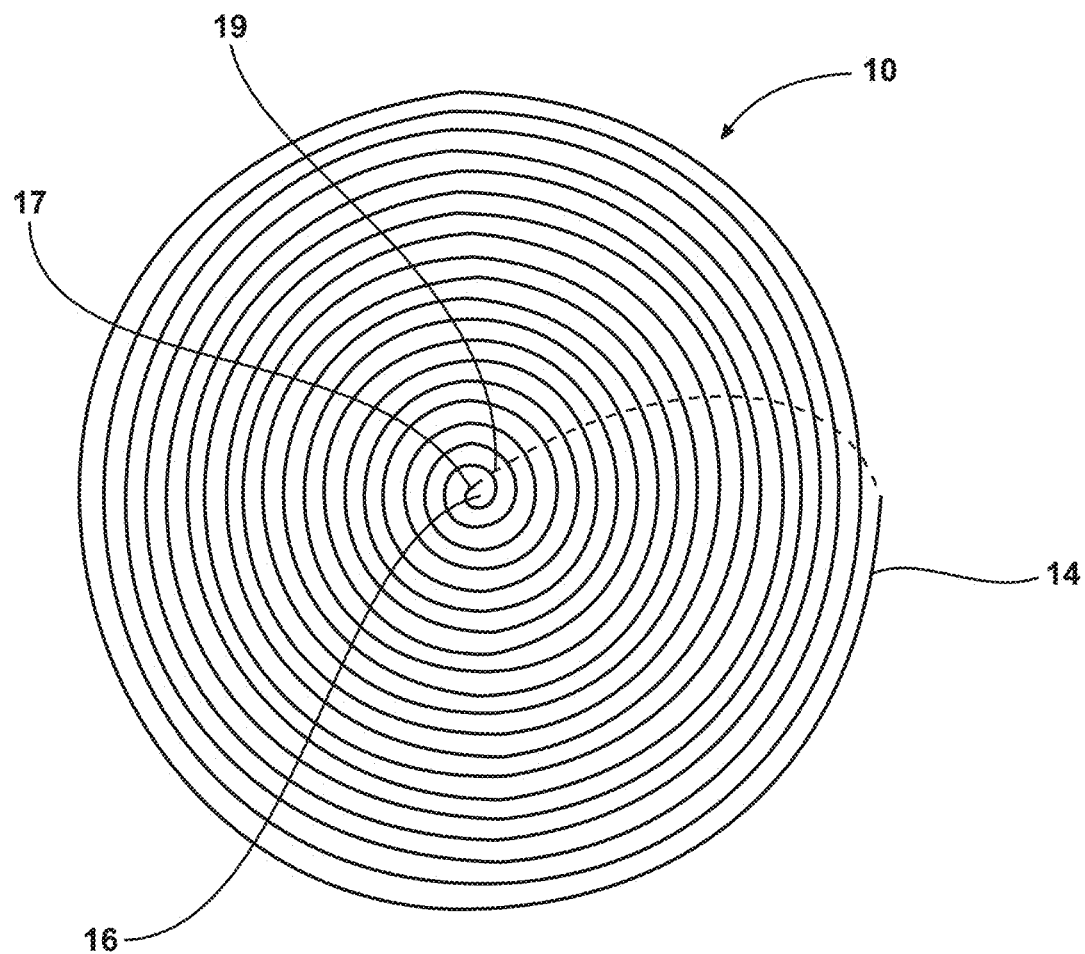
FIG. 2 is a schematic top view of the vacuum lift apparatus of FIG. 1.

FIG. 2 shows a top view of the vacuum lift apparatus 10 with the tube 14 aligned in a helical pattern. The tube 14 includes a first end 17 and a second end 19. In one embodiment, the tube 14 can be wound in a helical pattern in a circumferential plane and simultaneously form a spherical shape as the tube 14 is stacked line to line on top of itself as vacuum lift apparatus 10 is assembled. While the disclosed embodiment illustrates a single tube 14 to form the vacuum lift apparatus 10, it is contemplated herein that multiple tubes 14 can be operably connected together to form the vacuum lift apparatus 10. The tube 14 can be filled with a gas to a desired design pressure during assembly of the vacuum lift apparatus 10. Alternatively, the tube 14 can be partially filled or completely evacuated during assembly and then subsequently pressurized with a gas.

Figure 3A:
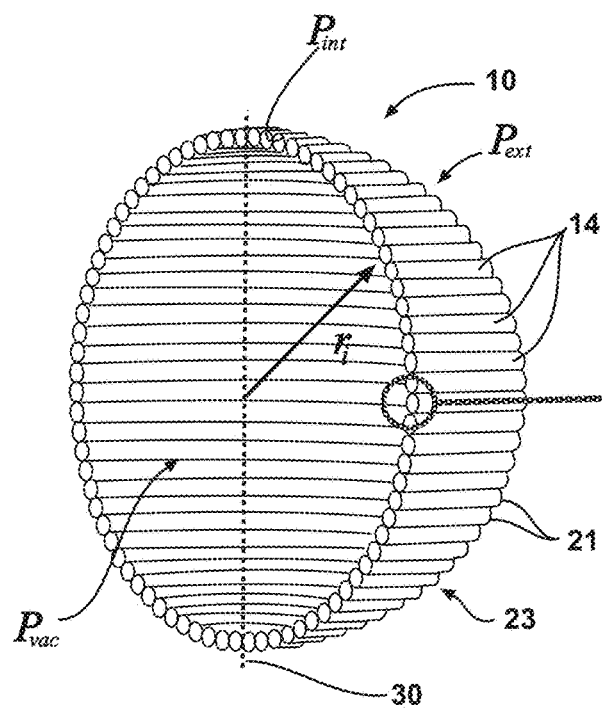
FIG. 3A is a cutaway view of the vacuum lift apparatus of FIG. 1.

Referring now to FIG. 3A, a cutaway view of the vacuum lift apparatus 10 is schematically illustrated. As the vacuum lift apparatus 10 is being assembled, the tube 14 can be sealed such that each tube layer 21 is connected to an adjacent tube layer 21 at either side to form a solid wall 23 which will restrict or prevent fluid from passing therethrough. $P_{ext}$ is the external pressure and $P_{vac}$ is the internal pressure or vacuum acting on the lift apparatus 10. $P_{int}$ is the internal pressure of the tube 14.

Figure 3B:
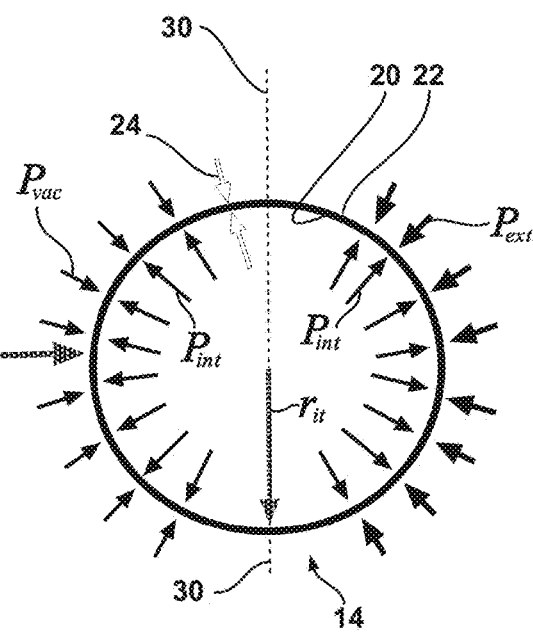
FIG. 3B is a cross sectional view of a tube used to form the body of the vacuum lift apparatus.

FIG. 3B shows an enlarged cross-sectional view of the tube 14. The tube 14 has an internal tube wall surface 20 that is acted on by an internal gas pressure $P_{int}$. In one embodiment the internal gas can be atmospheric air, but other gases are also contemplated such as by way of example and not limitation, atmospheric gas of other planets or other gases such as nitrogen, helium or hydrogen just to name a few. An outer wall surface 22 is spaced apart from the inner wall surface 20 to define a wall thickness 24 of the tube 14 illustrated by an opposing double arrow. The wall thickness 24, the radius $r_i$, and the material properties of the tube 14 define a strength and stiffness of the tube 14. A seal line 30 defines the location where the tube 14 is sealed to adjacent layers to form a solid wall 23 (see FIG. 3A). Depending on the material selection, the seal may be formed in a variety of ways. In some forms, the tube 14 may be heat sealed and in other forms the tube may be connected via a chemical process or by way of adhesives or the like. After the tube layers 21 are sealed together and the vacuum lift apparatus 10 is completely formed, a vacuum can be created internally and the resulting pressure $P_{vac}$ is defined therein. A true absolute vacuum will cause $P_{vac}$ to be zero, however present invention may still work if $P_{vac}$ is greater than zero as long as the weight density of the vacuum lift apparatus 10 is less that the density of the external atmosphere.

Figure 4A:
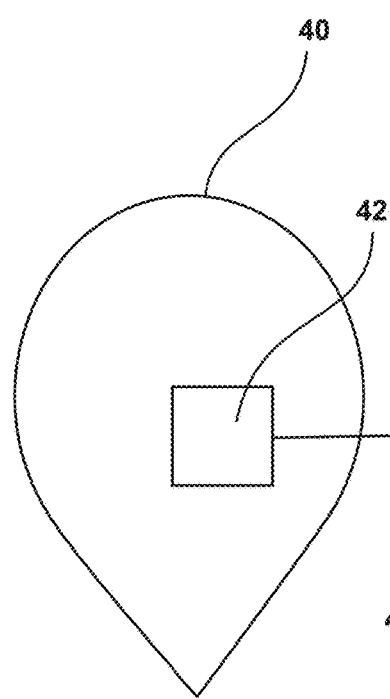
FIG. 4A is a schematic perspective view of a vacuum lift apparatus according another embodiment of the present disclosure.
Figure 4B:
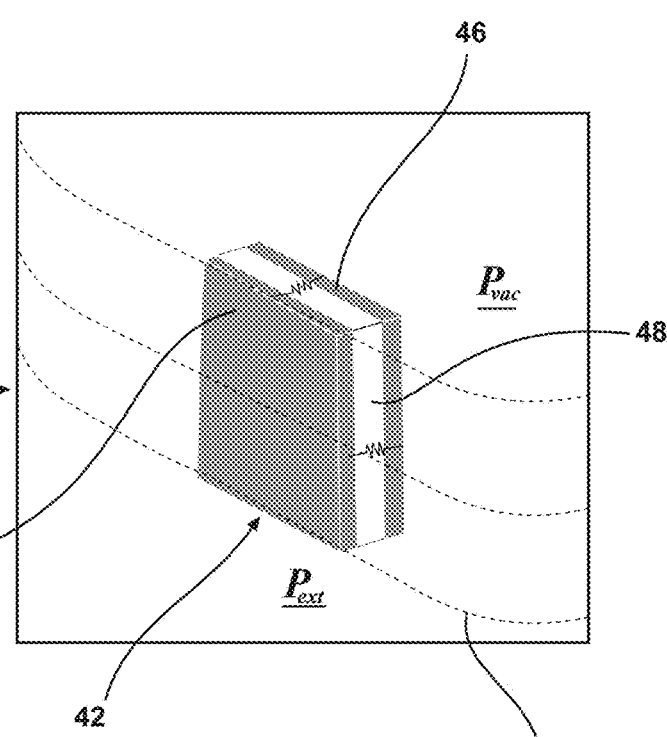
FIG. 4B is an enlarged section view of a portion of a wall of the vacuum lift apparatus of FIG. 4A.

Referring now to FIGS. 4A and 4B, a schematic view of a vacuum lift apparatus 40 according another embodiment of the present application is disclosed. The vacuum lift apparatus 40 can be of any shape, however a "traditional bulbous" balloon shape as illustrated is a typical form. The vacuum lift apparatus 40 includes a wall 42 having an outer membrane 44 and an inner membrane 46 with an intermediate volume 48 sandwiched between the inner and outer membranes 46, 44 respectively. The inner and outer membranes 46, 44, can be of any relatively lightweight material that resists or prevents fluid transfer therethrough. Typically a lightweight polymer would be used as a material, however the present invention is not limited as such.

The intermediate volume 48 may be filled and pressurized with a gas such as atmospheric air or other gasses as desired. The pressure in the intermediate volume 48 helps to hold the vacuum lift apparatus 40 in an expanded configuration so that the wall 42 will not collapse on itself when a vacuum is produced internal of the inner membrane. Similar to the vacuum lift apparatus 10, a valve system (not shown) can be operably coupled with the wall 42 to permit a vacuum pump to be connected and withdraw most or all of the gas internal from the hollow structure of the vacuum lift apparatus 40.

In operation, the vacuum lift apparatus 10 or 40 will rise in altitude so long as the density of the entire apparatus is lower than the surrounding atmosphere. The excess buoyancy of the vacuum lift apparatus 10 or 40 can be used to carry equipment to a desired altitude above ground. As long as the vacuum holds, the vacuum lift apparatus 10 or 40 will remain at that altitude. The vacuum lift apparatus 10 or 40 can control descent by opening an electronic valve to permit atmosphere to enter into the vacuum area. In other forms, a tether may be connected to the vacuum lift apparatus 10 or 40 and may be pulled down either manually or through a motorized winch system or the like.

In one aspect, the present disclosure includes a vacuum lift apparatus comprising: a tube wound in a helical pattern, wherein adjacent layers of tube are sealed together to form a solid wall and a defined hollow region; and a valve operably coupled to the wall.

In refining aspects, the solid wall resists fluid flow therethrough or the solid wall prevents fluid flow therethrough; wherein the tube is filled with a gas at a desired pressure; wherein means for sealing the adjacent layers of tube to one another include heat, chemical, and/or adhesive means; wherein a vacuum is generated within the hollow region with a pump; wherein the tube includes a plurality of tube segments coupled to one another; and wherein the tube is formed from a plastic material.

In another aspect, a method for lifting a load to a desired altitude with a vacuum lift apparatus comprising: forming a hollow fluid tight structure with a pressurized tube wound and sealed in a helical pattern; pumping fluid out of the hollow structure to form a vacuum region; attaching a load to the structure; lifting the load to a desired altitude via vacuum buoyancy.

In refining aspects, the method includes reducing the vacuum buoyancy of the structure to land the load on a surface; wherein the reducing includes filling the hollow structure with a gas to pressurize the vacuum region; controlling a fluid flow into and out of the hollow structure with a valve operably connected thereto; wherein the valve is electronically actuated.

In another aspect, a vacuum lift apparatus comprises: a hollow body defined by a fluid tight wall; wherein the fluid tight wall includes an outer membrane, an inner membrane and an intermediate volume positioned between the inner and outer membranes.

In refining aspects, the inner and outer membranes are formed from a plastic or polymer; wherein the intermediate volume is filed with a gas to cause the wall of the hollow body to hold a predefined shape; wherein the gas is pressurized air; further comprising a valve connected to the hollow body; further comprising a fluid pump connected to the valve configured to evacuate the hollow body; and wherein the hollow body will rise to a predetermined altitude after evacuating the hollow body.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A vacuum lift apparatus consisting of:
   a tube wound in a helical pattern, wherein adjacent layers of tube are sealed together to form a solid wall and a defined hollow region; and
   a valve operably coupled to the wall.

2. The apparatus of claim 1, wherein the solid wall resists fluid flow therethrough.

3. The apparatus of claim 1, wherein the solid wall prevents fluid flow therethrough.

4. The apparatus of claim 1, wherein the tube includes a plurality of tube segments coupled to one another.

5. The apparatus of claim 1, wherein the tube is formed from a polymer material.

6. A vacuum lift apparatus consisting of:
   a tube wound in a helical pattern, wherein adjacent layers of tube are sealed together to form a solid wall and a defined hollow region; and
   a valve operably coupled to the wall,
   wherein the tube is filled with a gas at a desired pressure.

7. A vacuum lift apparatus consisting of:
   a tube wound in a helical pattern, wherein adjacent layers of tube are sealed together to form a solid wall and a defined hollow region; and
   a valve operably coupled to the wall,
   wherein means for sealing the adjacent layers of tube to one another include heat, chemical, and/or adhesive means.

* * * * *